United States Patent
Kim

Patent Number: 5,818,538
Date of Patent: Oct. 6, 1998

[54] SYNC ON GREEN SIGNAL SEPARATING CIRCUIT OF AN IMAGE OUTPUT APPARATUS

[75] Inventor: Dae-Seong Kim, Gumi-si, Rep. of Korea

[73] Assignee: LG Semicon Co., Ltd., Chungcheongbuk-Do, Rep. of Korea

[21] Appl. No.: 688,130

[22] Filed: Jul. 29, 1996

[30] Foreign Application Priority Data

Jul. 27, 1995 [KR] Rep. of Korea ............... 1995-22540

[51] Int. Cl.$^6$ ........................................... H04N 5/08
[52] U.S. Cl. ..................... 348/525; 348/530; 348/532
[58] Field of Search ................................. 348/525, 526, 348/527, 528, 529, 530, 531, 532, 533, 534, 535, 500; 358/153, 154, 157; 345/150, 151, 213; H04N 5/08, 5/10

[56] References Cited

U.S. PATENT DOCUMENTS

| | | | |
|---|---|---|---|
| 3,743,774 | 7/1973 | Chipman et al. | 348/530 |
| 4,631,588 | 12/1986 | Barnes et al. | 358/149 |
| 5,410,363 | 4/1995 | Capen et al. | 348/679 |
| 5,497,201 | 3/1996 | Ogawa et al. | 348/525 |

FOREIGN PATENT DOCUMENTS

| | | | |
|---|---|---|---|
| 287382 | 12/1986 | Japan | H04N 5/08 |
| 57064033 | 3/1993 | Japan | H04N 5/08 |

OTHER PUBLICATIONS

Milton S. Kiver, "Television Electronics:Theory and Servicing", Van Nostrand Reinhold Company, p. 70, 579, 1973.

*Primary Examiner*—Chris Grant
*Attorney, Agent, or Firm*—Loudermilk & Associates

[57] ABSTRACT

A sync signal separating circuit of an image output apparatus includes an inversion amplifying section for providing a green video signal supplied from a video signal generator to be output as an output signal that is inverted and amplified, and a clipper receiving the output signal of the inversion amplifying section as an input signal to output a clipped output signal obtained by cutting over or below a prescribed amplitude. Here, the inversion amplifying section has an amplifying device, an input resistor and a feedback resistor, and the clipper has a diode having an anode connected to the output side of the inversion amplifying section and a load resistor having one side connected to a cathode of the diode and the other side grounded. Thus, the sync signal is accurately produced from the cathode of the diode without requiring a conventional horizontal sync signal detecting section.

6 Claims, 3 Drawing Sheets

SYNC ON GREEN SIGNAL SEPARATING CIRCUIT OF AN IMAGE OUTPUT APPARATUS

FIELD OF THE INVENTION

The present invention relates to sync signal separating circuits of an image output apparatus, and more particularly to sync signal separating circuits of an image output apparatus for easily separating a sync signal combined with a video signal supplied to the image output apparatus.

BACKGROUND OF THE INVENTION

Video signals of red, green and blue supplied for providing a picture to a monitor (image output apparatus) of a computer and the like include a video signal under a "synchronizing on green" (SOG) state in which horizontal and vertical sync signals (hereinafter referred to as "sync signals") are combined with a green signal and a video signal under a non-SOG state in which video signals of red, blue and green colors and the sync signals are formed separately from each other. It is provided such that the sync signal combined with the green video signal in the video signal under the SOG state has a negative (−) polarity and the video signal has a positive (+) polarity.

FIGS. 1 and 2A and 2B are views for explaining a sync signal separating circuit of a conventional image output apparatus. FIG. 1 is a circuit diagram of the sync signal separating circuit of the conventional image output apparatus, and FIGS. 2A and 2B are views illustrating waveforms of nodes a and b in the sync signal separating circuit of the conventional image output apparatus. More specifically, FIG. 2A is a view illustrating the waveforms of nodes a and b when the green video signal under the SOG state is supplied to the sync signal separating circuit of the conventional image output apparatus, and FIG. 2B is a view illustrating the waveforms of nodes a and b when the green video signal under the non-SOG state is supplied to the sync signal separating circuit of the conventional image output apparatus. Hereinafter, the construction and operation of the sync signal separating circuit of the conventional image output apparatus will be described with reference to the accompanying drawings.

The sync signal separating circuit of the conventional image output apparatus, as illustrated in FIG. 1, includes input resistor $R_i$ for impedance-matching to green video signal Sg supplied from a video signal generator (not shown), and PNP transistor QP having its collector grounded via resistor $R_4$ for inverting a phase of the sync signal combined to the green signal, which is the input video signal, and to amplify and output the result. Also, inversion amplifying section 10 consists of a plurality of resistors $R_1$, $R_2$ and $R_3$ for determining the magnitude of the output signal from PNP transistor QP. First NPN transistor $QN_1$ has its base receiving the output of inversion amplifying section 10 through resistor $R_5$, and its emitter grounded via resistor $R_6$ to serve as a buffering operation with respect to the input signal. Resistors R7 and R8 determine the magnitude of the output signal from first NPN transistor $QN_1$.

A horizontal sync signal detector provides a "high" output value when horizontal sync signal Hsync is supplied from the video signal generator and a "low" output value when the horizontal sync signal is not supplied from the video signal generator. Second NPN transistor $QN_2$ formed as a switching element is operated to be on/off in accordance with the output value of the horizontal sync signal detector to control the output signal from first NPN transistor $QN_1$. Coupling capacitor Cc is formed between input resistor $R_i$ and resistor $R_1$, for changing a DC bias voltage of the video signal from the video signal generator, and resistor $R_5$ is installed between an output of PNP transistor QP and the base of first NPN transistor $QN_1$. Here, the emitter of PNP transistor QP is supplied with a DC voltage of 5 volts via resistor $R_3$, as is the collector of first NPN transistor $QN_1$.

The operation of the sync signal separating circuit of the conventional image output apparatus constructed as above will be described with reference to FIG. 2.

First, once the video signal under the SOG state is supplied from the conventional video signal generator, i.e., once green video signal Sg obtained by combining the sync signal to the green signal is supplied, green video signal Sg passes through coupling capacitor Cc to reach node a. Then, the sync signal combined to green video signal Sg has a DC level determined by resistors $R_1$, $R_2$, $R_3$ and $R_4$ of inversion amplifying section 10 and PNP transistor QP. That is, inversion amplifying section 10 properly adjusts the resistance of resistors $R_1$, $R_2$ and $R_3$ so that the DC level of the green video signal is determined at node a to allow PNP transistor QP to be "on" in sync signal section $S_H$ combined with blank section $B_H$ of the green video signal and to be "off" in the other sections.

At this time, the output at the collector of PNP transistor QP, i.e., at node b, is provided while the sync signal combined to the green video signal is inverted and amplified to be separated, and the magnitude of the separated sync signal is determined by resistors R3 and R4 and PNP transistor QP.

Successively, the sync signal being output from the collector of PNP transistor QP, i.e., from node b, which has been inverted and amplified to be separated is provided via an output node, i.e., node c, of second NPN transistor $QN_2$ formed as the switching element as an output signal having a magnitude determined by resistors R7 and R8 while passing through first NPN transistor $QN_1$. When second NPN transistor $QN_2$ is operated to be "off" by an output value of the horizontal sync signal detector, the separated sync signal is output. Then, when second NPN transistor $QN_2$ is operated to be "on" by an output value of the horizontal sync signal detector, the separated sync signal flows through the grounded emitter of second NPN transistor $QN_2$, which thus cannot be output.

At this time, the output value of the horizontal sync signal detector is "high" when the horizontal sync signal is received apart from the video signal including the green signal combined with the sync signal. For this operation, second NPN transistor $QN_2$ being the switching element is to be "on". But, if horizontal sync signal Hsync is not received, the output value is "low," which makes second NPN transistor $QN_2$ as a switching element "off."

In other words, when the green video signal under the SOG state as illustrated in FIG. 2A is supplied to sync signal separating circuit of the conventional image output apparatus, the sync signal combined with the green video signal is inverted and amplified to be separated as the sync signal. Then, the output of the separated sync signal is controlled by second NPN transistor $QN_2$, being the switching element of which operation is "on/off" by the horizontal sync signal detector.

When the green video signal under a non-SOG state is supplied to the sync signal separating circuit of the conventional image output apparatus, i.e., when the green video signal that the sync signal is not combined with the green signal, PNP transistor QP is "on" only in blank section $B_H$ having the electrical potential of zero volts in the green video signal, and the output at node b becomes the video blank signal.

Additionally, the horizontal sync signal detector continuously outputs "high" by horizontal sync signal Hsync supplied separately from the video signal. Due to this output, second NPN transistor $QN_2$ continuously remains "on." Therefore, the video blank signal having passed through first NPN transistor $QN_1$ at node b flows to the grounded emitter of second NPN transistor $QN_2$ at node c, which thus cannot be output.

That is, in the sync signal separating circuit of the conventional image output apparatus, when the video signal under the non-SOG state as illustrated in FIG. 2B is received, the video blank signal obtained by inverting to amplify the phase of the green video signal in the blank section is produced, and the video blank signal flows to the grounded emitter of second NPN transistor $QN_2$, which becomes "on" state by the horizontal sync signal detector.

In the sync signal separating circuit of the conventional image output apparatus, the sync signal cannot be accurately separated in the sync signal separating circuit formed of the plurality of resistors $R_1$, $R_2$, $R_3$ and $R_4$ and PNP transistor QP. Accordingly, the horizontal sync signal detector is separately furnished to control the output of the sync signal separated from the green video signal. Also, respective elements such as resistors, transistors and capacitors are employed when constructing the circuit to increase the area when the circuit is embodied on a substrate and raise the construction cost, etc.

SUMMARY OF THE INVENTION

The present invention is devised to address the above-described problems. Accordingly, it is an object of the present invention to provide a sync signal separating circuit of an image output apparatus for accurately separating a sync signal from a green video signal to eliminate the conventional horizontal sync signal detector.

To achieve the above and other objects of the present invention, there is provided a sync signal separating circuit of an image output apparatus including an inversion amplifying section for allowing a green video signal supplied from a video signal generator to be output as a signal inverted and amplified, and a clipper for using the output signal of the inversion amplifying section as an input signal to provide a clipped output signal by cutting below a constant voltage level.

BRIEF DESCRIPTION OF THE DRAWINGS

The above objects and other advantages of the present invention will become more apparent by describing in detail the preferred embodiments thereof with reference to the attached drawings in which.

DESCRIPTION OF THE PREFERRED EMBODIMENTS

Figure 1:
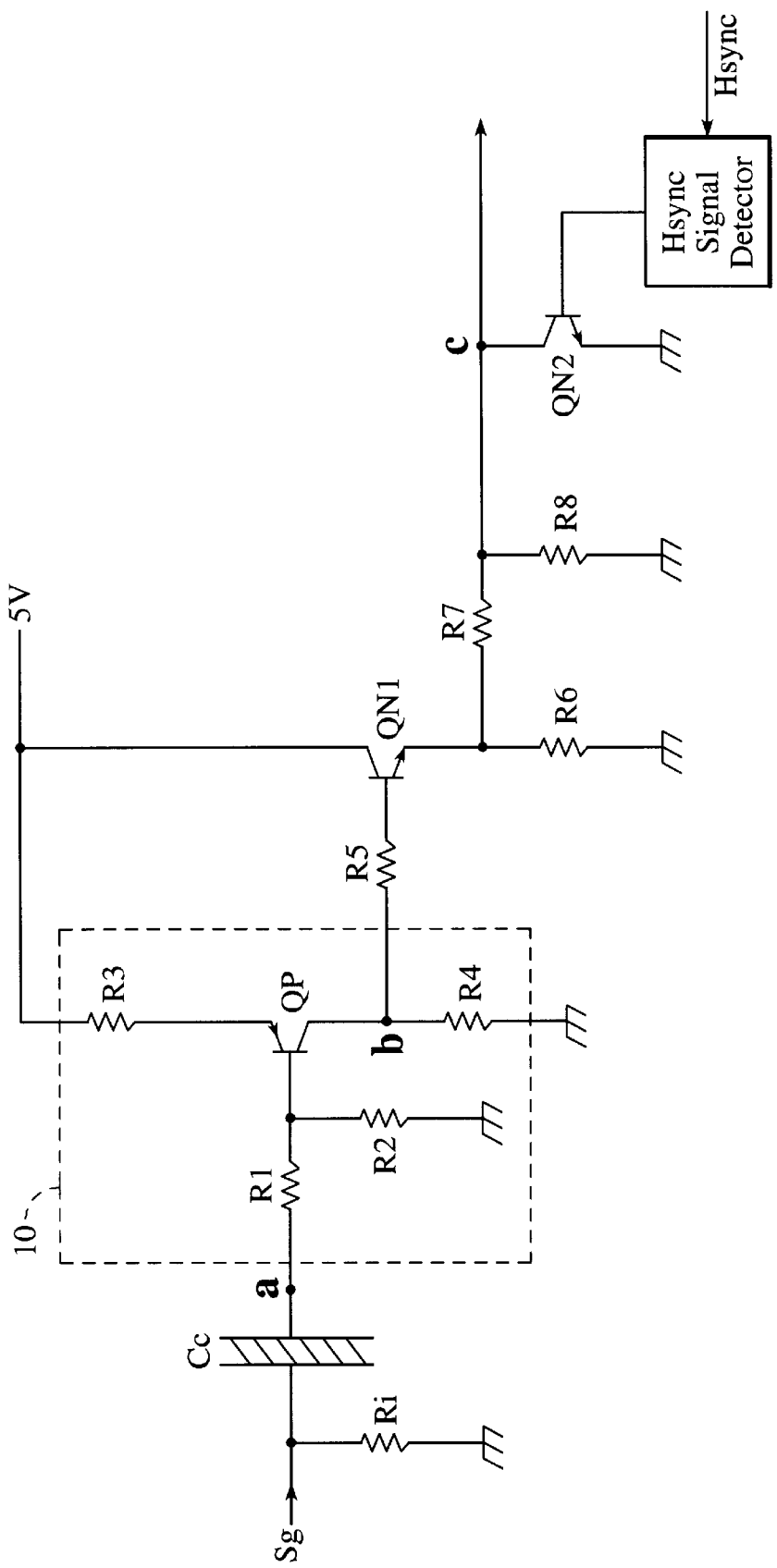
FIGS. 1 and 2A and 2B are views for explaining a sync signal separating circuit of a conventional image output apparatus.
Figure 2A:
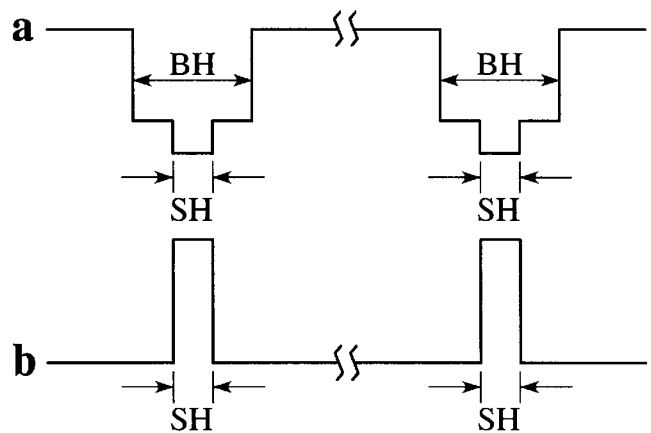
Figure 2B:
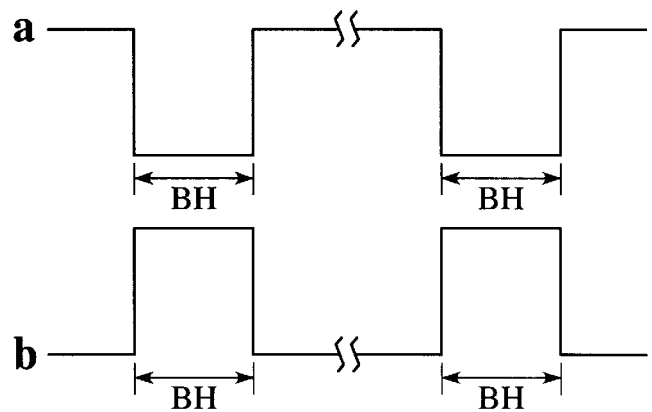
Figure 3:
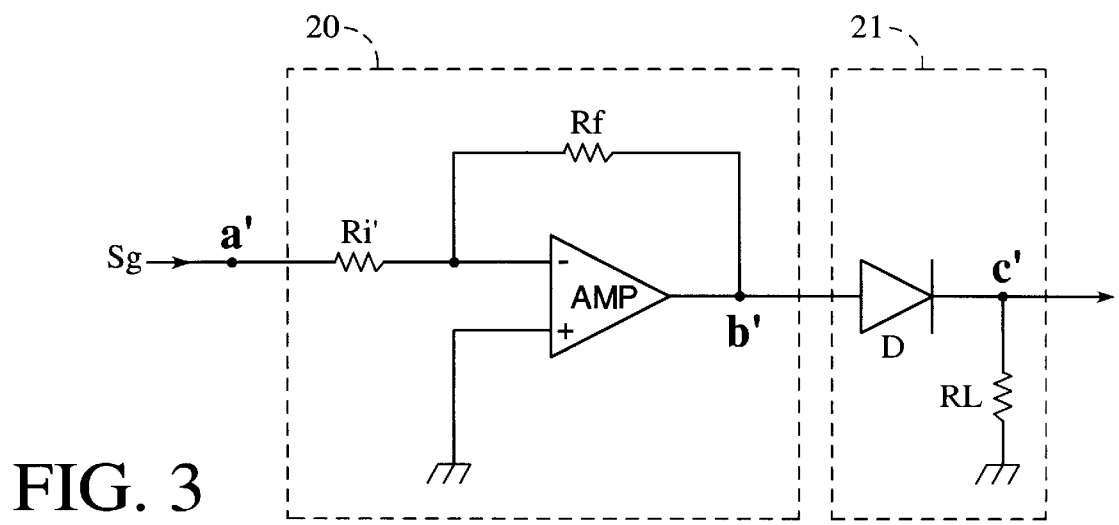
FIGS. 3 and 4A and 4B are views for explaining a sync signal separating circuit of an image output apparatus according to the present invention.
Figure 4A:
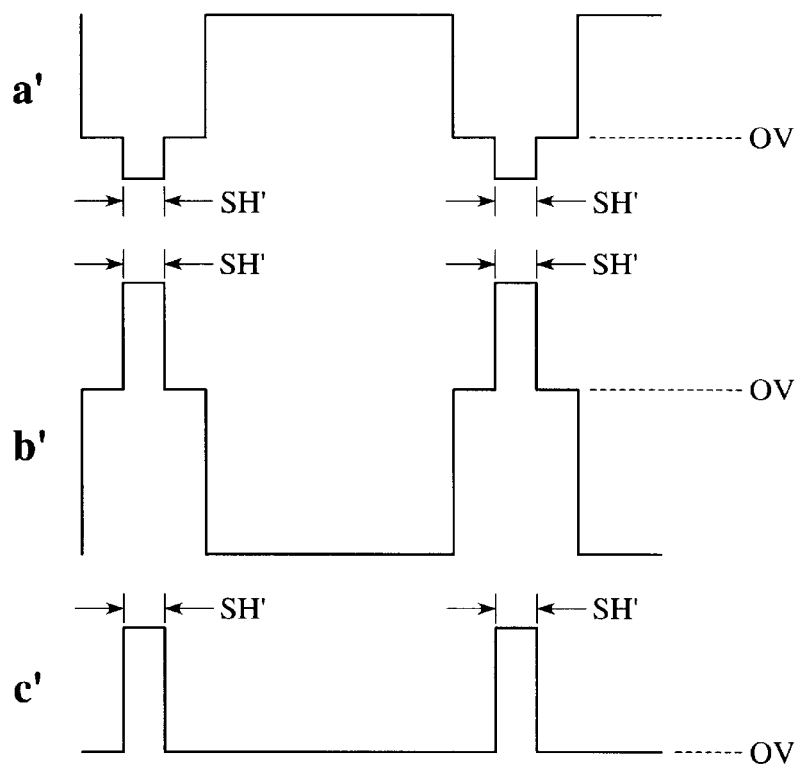
Figure 4B:
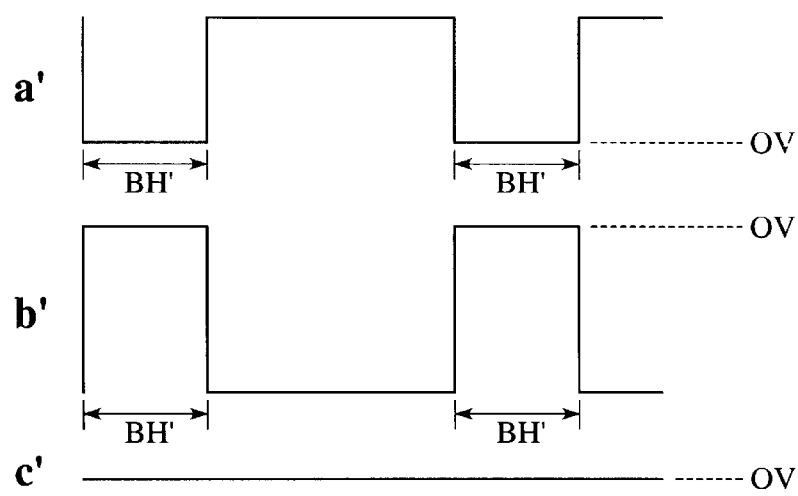

FIGS. 3 and 4A and 4B are views for illustrating a sync signal separating circuit of an image output apparatus according to the present invention, in which FIG. 3 is a circuit diagram illustrating a sync signal separating circuit of an image output apparatus according to the present invention, and FIGS. 4A and 4B are views illustrating waveforms at nodes a', b' and c' in a sync signal separating circuit of the image output apparatus according to the present invention. More specifically, FIG. 4A is a view illustrating the waveforms at nodes a', b' and c' when a video signal under the SOG state is supplied to the sync signal separating circuit of the image output apparatus according to the present invention; and FIG. 4B is a view illustrating the waveforms at nodes a', b' and c' when a video signal under the non-SOG state is supplied to the sync signal separating circuit of the image output apparatus according to the present invention.

Now, the construction and operation of a preferred embodiment of a sync signal separating circuit of an image output apparatus according to the present invention will be described with reference to the accompanying drawings.

The sync signal separating circuit of the image output apparatus according to the present invention, as illustrated in FIG. 3, includes inversion amplifying section 20 for producing an output signal obtained by inverting and amplifying a green video signal from a video signal generator (not shown), and clipper 21 consisting of diode D having an anode connected with the output signal of inversion amplifying section 20 and load resistor RL having one side connected to a cathode of diode D and the other side grounded. The sync signal is supplied from the cathode of diode D.

Inversion amplifying section 20 is comprised in the preferred embodiment of amplifying device Amp having a negative input terminal supplied with green video signal Sg and a positive input terminal grounded, input resistor $R_i'$ serially connected to the negative input terminal as illustrated, and feedback resistor $R_f$ connected between the negative input terminal of amplifying device Amp and input resistor $R_i'$ and the output side of amplifying device Amp. An amplifying ratio of inversion amplifying section 20 corresponds to a ratio of input resistor $R_i'$ with respect to feedback resistor $R_f$, i.e., an absolute value obtained by dividing the value of feedback resistor $R_f$ by the value of input resistor $R_i'$.

Diode D of clipper 21 is operated to be "on" when the sync signal is combined with the input green signal, i.e., when the green video signal is under the SOG state since the output of inversion amplifying section 20 becomes a positive voltage level; otherwise to be "off" when the sync signal is not combined with the green signal, i.e., in the non-SOG state, since the output of inversion amplifying section 20 has a negative voltage level.

The sync signal separating circuit of the image output apparatus according to the present invention is constructed to invert and amplify the video signal from the video signal generator to provide the result, and separate the sync signal by using an operational characteristic of diode D in clipper 21, which is turned "on" only when the forward bias is supplied with respect to the resulting output signal or "off" when the backward bias is supplied.

Hereinbelow, an operation of the sync signal separating circuit of the image output apparatus according to the present invention will be described with reference to FIG. 4.

To begin with, when the green video signal under the SOG state as the a' node output waveform illustrated in FIG. 4A is received into the sync signal separating circuit of the image output apparatus according to the present invention, the video signal passes through input resistor $R_i'$ of inversion amplifying section 20 at node a' to be supplied to amplifying device Amp. The phase of the video signal is inverted to output the green video signal to node b' as the signal having the b' node output waveform as illustrated in FIG. 4A, in accordance with the amplifying ratio determined by input resistor $R_i'$ and feedback resistor $R_f$.

In more detail, the sync signal in the green video signal under the SOG state has a negative polarity at node a', and section $S_H'$ of the sync signal combined with the green signal in the output signal at node b' which is the output terminal of inversion amplifying section 20 has a positive polarity. Simultaneously, the magnitude of the signal is amplified as much as the amplifying ratio as determined by input resistor $R_i'$ and feedback resistor $R_f$.

Also, the output signal supplied to node b' which is the output terminal of inversion amplifying section 20 is supplied to clipper 21, in which, since diode D of clipper 21 is "on" to be conducting only when a positive signal is supplied, only the sync signal combined with the green video signal is separated to be output from node c', which is the output side of clipper 21.

That is, when the SOG signal is received into the sync signal separating circuit of the image output apparatus according to the present invention, the sync signal of negative polarity combined with the green video signal is inverted to have a positive polarity and then amplified by inversion amplifying section 20. By doing so, diode D of clipper 21 is "on" to separate only the sync signal of positive polarity included in the green video signal, and the result is provided.

Furthermore, when the green video signal under the non-SOG state is supplied to the sync signal separating circuit of the image output apparatus according to the present invention, i.e., when the pure green video signal without being combined with the sync signal and the sync signal are separately supplied, the green video signal has a positive polarity at node a' to be supplied to inversion amplifying section 20. Also, the output signal to node b' which is the output terminal of inversion amplifying section 20 becomes a signal having both a blank section $B_H'$ of zero volts of the green video signal by inversion amplifying section 20 and other sections inverted to negative polarity and amplified.

Thereafter, diode D of clipper 21, receiving the signal having a phase inverted to a negative polarity and amplified by inversion amplifying section 20 continuously maintains an "off" state to make the output signal valve of node c' being the output terminal of clipper 21 be the video blank signal of 0 volts.

As a result, when the video signal having only the positive polarity under the non-SOG state is supplied to the sync signal separating circuit of the image output apparatus according to the present invention, as illustrated in FIG. 4B, the video signal is inverted to have the negative polarity and amplified by inversion amplifying section 20. By this operation, diode D of clipper 21 is to be "off" to continuously produce the video blank signal.

The sync signal separating circuit of the image output apparatus according to the present invention utilizes an inversion amplifying section and a clipper in a manner which provides only the signal of positive polarity to accurately separate the sync signal, thereby eliminating the horizontal sync signal detecting circuit of the conventional sync signal separating circuit.

Although various preferred embodiments of the present invention have been disclosed for illustrative purposes, those skilled in the art will appreciate that various modifications, additions and/or substitutions are possible without departing from the scope and spirit of the present invention as disclosed in the claims.

What is claimed is:

1. A sync on green (SOG) signal separating circuit of an image output apparatus comprising:

an inversion amplifier circuit receiving at an inverting input of the inversion amplifier circuit an SOG video signal supplied from a video signal generator, the SOG video signal having video information biased above a zero voltage level and a sync signal biased below the zero voltage level, the inversion amplifier circuit generating an output signal that is based on inverting and amplifying the received SOG video signal, the inversion amplifier circuit having a non-inverting input coupled to the zero voltage level; and a clipper comprising a diode having an anode and a cathode and receiving the output signal of the inversion amplifying circuit as an input signal at the anode of the diode, wherein a load resistance is coupled to the cathode of the diode and coupled to the zero voltage level, wherein the sync signal is produced from the cathode of the diode.

2. A sync on green signal separating circuit of an image output apparatus as claimed in claim 1, wherein the inversion amplifying circuit comprises:

an amplifying device having an inverting input terminal receiving the SOG video signal through an input resistor serially connected to the inverting input terminal and a non-inverting input terminal that is coupled to the zero voltage level; and a feedback resistor connected to the inverting input terminal between the amplifying device and the input resistor and to an output of the amplifying device.

3. A sync on green signal separating circuit of an image output apparatus as claimed in claim 1, wherein the load resistance comprises a load resistor having one side connected to the cathode of the diode and another side coupled to the zero voltage level.

4. An apparatus, comprising:

an image output device generating a sync on green (SOG) video signal, the SOG video signal having video information biased above a zero voltage level and a sync signal biased below the zero voltage level;

an inverting amplifier circuit coupled to receive the SOG video signal on an inverting input terminal of the inverting amplifier circuit and providing an output signal on an output terminal of the inverting amplifier circuit, the inverting amplifier circuit having a non-inverting input coupled to the zero voltage level;

a diode coupled to the output terminal of the inverting amplifier circuit and generating a sync output signal across a load resistance, wherein the sync output signal comprises separated sync pulses biased above the zero voltage level when the SOG video signal has sync signals combined with a color signal, wherein the sync output signal comprises the zero voltage level when the SOG video signal does not have sync signals combined with the color signal.

5. The apparatus of claim 4, wherein the inverting amplifier circuit comprises:

an amplifying device having an inverting input terminal receiving the SOG video signal through an input resistor serially connected to the inverting input terminal and a non-inverting input terminal that is coupled to the zero voltage level; and a feedback resistor connected to the inverting input terminal between the amplifying device and the input resistor and to an output of the amplifying device.

6. The apparatus of claim 4, wherein the load resistance comprises a load resistor having one side connected to a cathode of the diode and another side coupled to the zero voltage level.

* * * * *